Nov. 29, 1960
R. C. TREXLER
2,962,658
DIRECTIONAL TACHOMETER GENERATOR
Filed Sept. 27, 1957
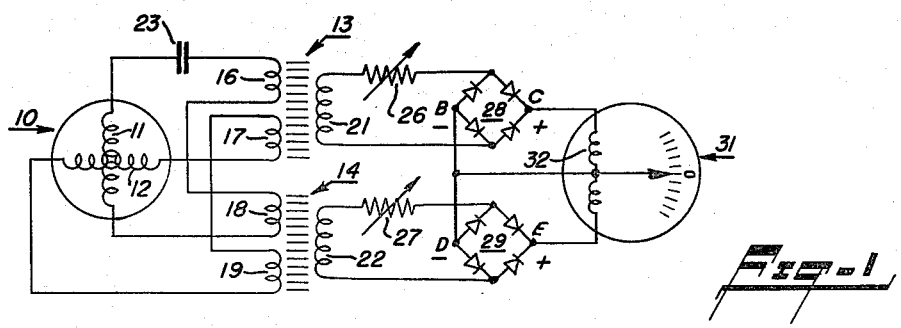
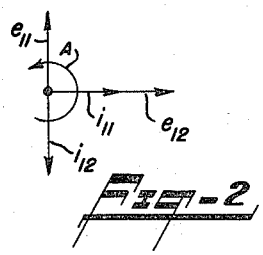
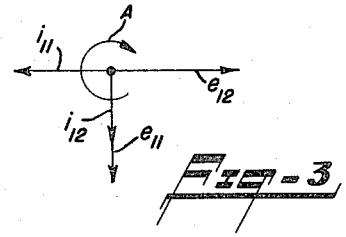
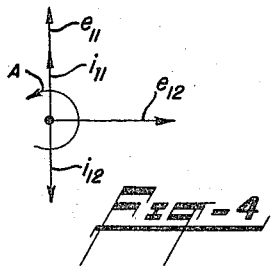
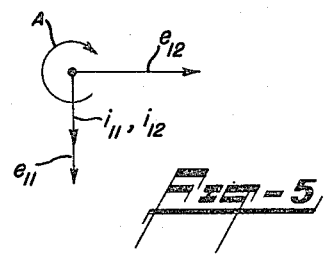
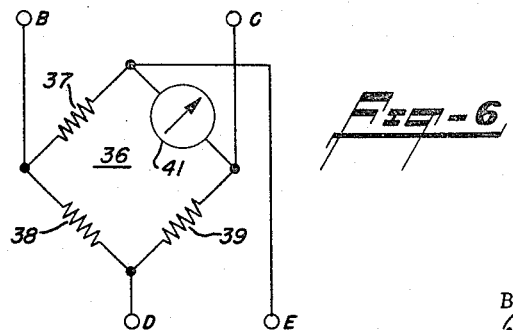
ROBERT C. TREXLER
INVENTOR.
BY
Rudolph J. Juick
ATTORNEY United States Patent Office 2,962,658
Patented Nov. 29, 1960

2,962,658

DIRECTIONAL TACHOMETER GENERATOR

Robert C. Trexler, Orange, N.J., assignor, by mesne assignments, to Daystrom, Incorporated, Murray Hill, N.J., a corporation of New Jersey Filed Sept. 27, 1957, Ser. No. 686,791

17 Claims. (Cl. 324—70)

This invention relates to a frequency sensitive electrical system which is responsive to the frequency and phase relation of a pair of input signals, the said system being particularly adapted for use in a frequency sensitive directional tachometer.

The electrical system of my invention may be utilized in any apparatus requiring a system which is sensitive to both the phase and frequency of a pair of input signals. For purposes of illustration, however, the system is shown and described as used in a frequency sensitive directional tachometer. Contemporary directional tachometers, that is, tachometers which are sensitive to the direction of rotation of the rotating member, are dependent to a large extent, upon the magnitude of generator voltages and/or the matching of rectifiers; the generators and rectifiers being normally essential components of the system. The frequency responsive alternating current directional tachometer of my invention, on the other hand, is substantially independent of the generator voltages and the matching of rectifiers.

An object of this invention is the provision of an electrical system which is both phase and frequency sensitive to a pair of input signals.

An object of this invention is the provision of a frequency responsive alternating current directional tachometer which is substantially independent of generator voltage magnitude and the matching of rectifiers.

An object of this invention is the provision of an electrical system comprising a source of first and second quadrature voltage values one of which either leads or lags the other, a pair of saturable core transformers each of which includes a pair of input windings and an output winding, one input winding on one transformer being connected in series with one input winding on the other transformer and the other input winding on the one transformer being connected in series with the other input winding on the other transformer, means energizing one of the pair of series connected input windings with the said first voltage value, a reactive element, means energizing the other of the pair of series connected input windings through the said reactive element with the said second voltage value, a potential being developed in one of the said transformer output windings when the said first voltage value lags the said second voltage value, and a potential being developed in the other of the said transformer output windings when the said first voltage value leads the said second voltage value, the magnitude of the said output potentials being directly related to the frequency of the said source voltages.

These and other objects and advantages will become apparent from the following description when taken with the accompanying drawings. The drawings are for purposes of illustration and are not to be construed as defining the scope or limits of the invention, reference being had for the latter purpose to the appended claims.

In the drawings wherein like reference characters denote like parts in the several views:

Figure 1 is a schematic circuit diagram of my novel electrical system;

Figure 2 is a vector diagram of the two-phase generator output for one direction of generator rotation;

Figure 3 is a vector diagram of the generator output for rotation in the other direction;

Figure 4 is a vector diagram which is similar to Figure 2 only showing one phase of the generator output rotated 90 degrees;

Figure 5 is a vector diagram which is similar to Figure 3 only showing one phase of the generator output rotated 90 degrees; and Figure 6 is a schematic circuit diagram of a modified measuring circuit which may be utilized in my system.

Reference is first made to Figure 1 of the drawings, wherein there is shown a two phase generator 10 having a pair of generator windings 11 and 12 for producing two voltages which are ninety (90) electrical degrees apart. In practice, for moderate rotational speeds, between 500 to 15,000 r.p.m., for example, the generator is often of the permanent magnet type comprising a stator having eight (8) coils and a permanent magnet rotor which is charged to four (4) poles. At higher speeds, the number of coils and poles is reduced in order to keep the frequency within reasonable limits. A pair of saturable core transformers 13 and 14 each having a pair of primary windings 16, 17 and 18, 19, respectively, and an output winding 21 and 22, respectively, are included. The generator winding 11 is connected through a series phase-shifting capacitor 23 to the series connected windings 16 and 18 on the transformers 13, and 14, respectively, while the generator winding 12 is connected to the series connected transformer primary windings 17 and 19 on the transformers 13 and 14, respectively. The generator outputs are applied to the input windings of the transformers 13 and 14 in a manner such that if the transformer input currents are substantially in-phase, the resulting M.M.F's in the core of the transformer 13 will have aiding polarities while the M.M.F.'s in the core of the transformer 14 will have opposing polarities. If, on the other hand, the currents are substantially 180 degrees out-of-phase, the resulting M.M.F.'s in the core of the transformer 13 will have opposing polarities while the M.M.F.'s in the core of the transformer 14 will have aiding polarities.

Preferably, the transformers are of the closed ring, ribbon wound, core type with toroidal primary and secondary windings. The ribbon wound transformer cores are of a material having a generally rectangular B–H loop and a coercivity that is very small. For example, cores which saturate with approximately 0.3 oersted may be used which, when saturated, have a flux density of approximately 14,000 gausses.

The transformer output windings 21 and 22 are connected through adjustable resistors 26 and 27 to the input diagonals of full-wave rectifier bridge networks 28 and 29, respectively. The rectifier bridge output diagonals, designated by reference characters B, C and D, E, respectively, are connected to a permanent magnet moving coil instrument 31. The instrument 31 is provided with a center-tapped moving coil 32 thereby providing zero center, three terminal operation. The negative terminals of the rectifier bridges are shown connected together and to the center tap of the movable coil 32, while the positive terminals are connected to the opposite ends of the moving coil. For one direction of generator rotation the instrument 31 will deflect in one direction, and for the opposite direction of generator rotation deflection of the instrument in the opposite direction results. The magnitude of deflection is directly proportional to the speed of rotation of the generator. (Obviously, a pair of single moving coil instruments may be used in place of the center-tapped moving coil instrument; one of the said single moving coil instruments being connected to each of the rectifier bridge output diagonals.)

Reference is now made also to the vector diagrams of Figures 2 through 5 for an explanation of the operation of my novel frequency sensitive alternating current directional tachometer. In Figure 2, assuming a counterclockwise rotation of the generator rotor as indicated by the arrow designated A, the voltage developed in the generator coil 11, which voltage is designated $e_{11}$, leads the voltage $e_{12}$, developed in coil 12. The respective currents $i_{11}$ and $i_{12}$ lag the voltages $e_{11}$ and $e_{12}$ by ninety (90) degrees, assuming purely inductive loading of the generator. For a clockwise rotation of the generator, as seen in Figure 3, the voltage $e_{11}$ lags the voltage $e_{12}$ by ninety (90) degrees, and the currents $i_{11}$ and $i_{12}$ lag the respective voltages by ninety (90) degrees, again assuming a purely inductive loading. Figures 4 and 5 illustrate the effect upon the generator output when considering, also, the phase shifting capacitor 23. For counter-clockwise rotation, as shown in Figure 4, the voltages $e_{11}$ and $e_{12}$ maintain the same relative phase as shown in Figure 2. However, the current $i_{11}$, because of the capacitor 23, will shift in phase ninety (90) degrees to a position 180 degrees out of phase with the current $i_{12}$. For a clockwise generator rotation, as shown in Figure 5, the current $i_{11}$ will be shifted 90 degrees from that illustrated in Figure 3, but to a position in phase with the current $i_{12}$. Thus, for one direction of rotation of the generator, the currents to the transformer input windings are in phase, and for the opposite rotation, the same currents are 180 degrees out of phase.

Referring now again to Figure 1, for the in-phase condition of the currents $i_{11}$ and $i_{12}$ (shown vectorially in Figure 5, wherein the generator is rotated in a clockwise direction) the core of the transformer 13 easily saturates each one-half cycle of input current thereto. Therefore, as is well understood by those skilled in this art, the number of coulombs, per pulse, which are delivered from the secondary winding 21 of the transformer 13 is a fixed and stable quantity, with a fixed load thereon. The pulses at the secondary winding are fed through the adjustable resistor 26, rectified by the full-wave rectifier 28, and fed to the instrument 31. The pulses will vary in frequency according to the rate of rotation of the generator 10, and the current through the meter 31 from the rectifier 28 will, therefore, be directly proportional to the rate of rotation of the generator. For the in-phase condition of the currents $i_{11}$ and $i_{12}$, the core of the transformer 14 is maintained at substantially zero net M.M.F. whereby little or no voltage is developed at the secondary winding 22 thereof.

For counter-clockwise rotation of the generator 10 wherein the currents $i_{11}$ and $i_{12}$ are substantially 180 degrees out of phase (as shown in Figure 4), the core of the transformer 14 saturates each one-half cycle of input current while the net M.M.F. in the core of the transformer 12, is maintained at substantially zero. Thus, pulses which vary in frequency according to the rate of rotation of the generator 10 will be developed at the secondary winding 22 of the transformer 14, rectified by the rectifier 29 and fed to the instrument 31. The instrument will, therefore, be deflected in the other direction an amount which is directly proportional to the rotational speed of the generator. It will be seen, then, that the system "switches" operation from one transformer to the other depending upon the rotational direction of the generator 10.

The instrument 31 may, if desired, be provided with a scale graduated in terms of r.p.m., or any other suitable terms. The resistors 26 and 27 serve as current limiting resistors, and are adjustable to properly calibrate the instrument within a wide range of generator speed. Obviously, with a normal zero center instrument, the variable resistors 26 and 27 may be set at different values whereby the full scale deflection in one direction corresponds to one rate of generator rotation while full scale deflection in the other direction corresponds to another rate of generator rotation in the opposite direction.

Sources of current which are either in-phase or 180 degrees out-of-phase, other than the two-phase generator with the phase-shifting capacitor 23 in one phase thereof, as shown and described above, are considered within the scope of this invention. Thus, my invention is not limited to a tachometer, or even to a device utilizing a two-phase generator. The input to the transformers 13 and 14 may be derived from any suitable source, which source produces currents either in-phase or 180 degrees out-of-phase. Further, my invention is not limited to the use of a three terminal, center-tapped moving coil type instrument in the measuring circuit thereof, as shown and described above, or even to the use of two separate D.-C. instruments, as described above, since any suitable measuring, or utilization circuit may be employed. Another measuring circuit which is suitable for use in my system is shown in Figure 6 and comprises a bridge network, designated 36, which network includes three resistors 37, 38 and 39, and a single moving coil instrument 41 having a normal zero-center position. One pair of input diagonals of the meter bridge 36 is connected to the output diagonals B, C of the rectifier bridge 28 while the other pair of input diagonals is connected to the output diagonals D, E of the other rectifier bridge 29. Thus, with an output from the bridge network 28, the meter 41 will deflect in one direction and with an output from the bridge network 29 the meter will deflect in the opposite direction.

Having now described my invention in detail in accordance with the patent statutes, various other changes and modifications will suggest themselves to those skilled in this art, and it is intended that such changes and modifications shall fall within the spirit and scope of the invention as recited in the following claims.

I claim:

1. An electrical system comprising, means affording a source of first and second current values which are either in phase or substantially 180 degrees out of phase, a pair of saturable core transformers each of which includes a pair of input windings and an output winding, one input winding on one transformer being connected in series with one input winding on the other transformer and the other input winding on the one transformer being connected in series with the other input winding on the other transformer, means energizing one of the pair of series connected input windings with the said first current value, means energizing the other of the pair of series connected input windings with the said second current value, a potential being developed in one of the said transformer output windings when the said first and second current values are substantially in phase, and a potential being developed in the other output winding when the first and second current values are substantially 180 degrees out of phase, the magnitude of the said output potentials being directly related to the frequency of the said source currents.

2. An electrical system comprising, means affording a source of first and second quadrature voltage values one of which may either lead or lag the other, a pair of saturable core transformers each of which includes a pair of input windings and an output winding, one input winding on one transformer being connected in series with one input winding on the other transformer and the other input winding on the one transformer being connected in series with the other input winding on the other transformer, means energizing one of the said pair of series connected input windings with the said first voltage value, a reactive element, means energizing the other of the said pair of series connected input windings with the said second voltage value through the said reactive element, a potential being developed in one of the said transformer output windings when the said one input voltage value leads the other, and a potential being developed in the other transformer output winding when the said one input voltage value lags the other, the magnitude of the said output potentials being directly related to the frequency of the said source voltages.

3. The invention as recited in claim 2 including a measuring circuit having an indicating instrument, and means connecting the said transformer secondary windings to the said measuring circuit.

4. The invention as recited in claim 3 wherein the said measuring circuit includes a pair of rectifiers.

5. The invention as recited in claim 3 including a pair of rectifiers, the said measuring circuit including a meter bridge network which includes the said indicating instrument, the said means connecting the said transformer secondary windings to the said measuring circuit including the said rectifiers wherein the rectifier outputs are connected to opposite diagonals of the said meter bridge network.

6. A frequency sensitive directional tachometer comprising, a two-phase generator rotatable in either direction, the first voltage output therefrom lagging the second voltage output by 90 degrees for one direction of generator rotation and leading by 90 degrees for rotation in the opposite direction, a pair of saturable core transformers each having a pair of input windings and an output winding, one input winding on one transformer being connected in series with one input winding on the other transformer and the other input winding on the one transformer being connected in series with the other input winding on the other transformer, means energizing one of the said pair of series connected input windings with the said first voltage from the generator, a reactance element, means energizing the other of the said pair of series connected input windings with the said second voltage from the generator through the said reactance element, a potential being developed in one of the said transformer output windings when the said generator is rotated in one direction and a potential being developed in the other of the said output windings when the said generator is rotated in the opposite direction, the magnitude of the said output potentials being directly related to the rate of rotation of the said generator.

7. The invention as recited in claim 6 including a measuring circuit having an indicating instrument, and means connecting the said transformer secondary windings to the said measuring circuit.

8. The invention as recited in claim 7 wherein the said measuring circuit includes a pair of rectifiers.

9. The invention as recited in claim 7 wherein the said means connecting the said transformer secondary windings to the said measuring circuit includes a pair of rectifiers, the said measuring circuit including a meter bridge circuit which includes the said indicating instrument, the said rectifier outputs being connected to opposite diagonals of the said meter bridge circuit.

10. An electrical system comprising, means affording a source of first and second quadrature voltage values one of which either leads or lags the other, a pair of saturable core transformers each having a first and second input winding and an output winding, means connecting the said first input windings on the said transformers in series circuit relation, means connecting the said second input windings on the said transformers in series circuit relation, means connecting the said first voltage across one of the said series connected input windings, means connecting the said second voltage across the other of the said series connected input windings through a reactance member, the first input winding on said one transformer being disposed such that when the flux produced by the current therethrough is in magnetic opposition to the flux produced by the current flow in the associated second input winding thereon, the flux produced by the current flow through the first input winding on the other transformer will be additive to the flux produced by the current flow through the associated second input winding whereby an output potential is developed at one of the said transformer output windings when the said one input voltage leads the other input voltage, and an output being developed at the other of the said transformer output windings when the said one input voltage lags the other input voltage, the magnitude of the transformer outputs being directly related to the frequency of the said voltage sources.

11. The invention as recited in claim 10 including a measuring circuit having an indicating instrument, and means connecting the said transformer secondary windings to the said measuring circuit.

12. The invention as recited in claim 11 wherein the said measuring circuit includes a pair of rectifiers.

13. The invention as recited in claim 11 wherein the said means connecting the said transformer secondary windings to the said measuring circuit includes a pair of rectifiers, the said measuring circuit including a meter bridge network which includes the said indicating instrument, the said rectifier outputs being connected to opposite diagonals of the said meter bridge network.

14. A frequency sensitive directional tachometer comprising, a two-phase generator rotatable in either direction, the first voltage output therefrom lagging the second voltage output by 90 degrees for generator rotation in one direction and leading by 90 degrees for opposite generator rotation, a pair of saturable core transformers each having a first and second input winding and an output winding, means connecting the said first input windings on the said transformers in series circuit relation, means connecting the said second input windings on the said transformers in series circuit relation, means connecting the first voltage output of the said generator across one of the said pair of series connected transformer input windings, a reactance element, means connecting the said second voltage output of the said generator across the other of the said pair of series connected transformer input windings through the said reactance element, the first input winding on the said one transformer being disposed such that when the flux produced by the current flow therethrough is in magnetic opposition to the flux produced by the current flow in the associated second input winding thereon the flux produced by the current flow through the first input winding on the other transformer will be additive to the flux produced by the current flow through the associated second input winding whereby an output potential is developed in one of the said transformer output windings when the said generator is rotated in one direction and a potential being developed in the other of the said transformer output windings when the said generator is rotated in the opposite direction, the transformer output voltage magnitude being directly related to the rate of rotation of the said generator.

15. The invention as recited in claim 14 including a measuring circuit having an indicating instrument, and means connecting the said transformer secondary windings to the said measuring circuit.

16. The invention as recited in claim 15 wherein the said measuring circuit includes a pair of rectifiers.

17. The invention as recited in claim 15 wherein the said means connecting the said transformer secondary windings to the said measuring circuit includes a pair of rectifiers, the said measuring circuit including a meter bridge circuit which includes the said indicating instrument, the said rectifier outputs being connected to opposite diagonals of the said meter bridge circuit.

References Cited in the file of this patent

UNITED STATES PATENTS

| | | |
|---|---|---|
| 2,198,371 | Wolferz et al. | Apr. 23, 1940 |
| 2,228,090 | Smith | Jan. 7, 1941 |
| 2,500,548 | Keller | Mar. 14, 1950 |
| 2,575,494 | Hornfeck | Nov. 20, 1951 |
| 2,609,512 | Conviser | Sept. 2, 1952 |
| 2,727,999 | Rusler | Dec. 20, 1955 |